US012560055B1

(12) United States Patent
Cui et al.

(10) Patent No.: US 12,560,055 B1
(45) Date of Patent: Feb. 24, 2026

(54) VIRTUAL DRILLING MODELING METHOD AND SYSTEM BASED ON OUTCROP FINE CHARACTERIZATION

(71) Applicant: Institute of Geology and Geophysics, Chinese Academy of Sciences, Beijing (CN)

(72) Inventors: Zhendong Cui, Beijing (CN); Shengwen Qi, Beijing (CN); Tao Wei, Beijing (CN); Leilei Zhao, Beijing (CN); Xiaojie Jiao, Beijing (CN); Jiayi Li, Beijing (CN); Xuehui Zhang, Beijing (CN)

(73) Assignee: Institute of Geology and Geophysics, Chinese Academy of Sciences, Beijing (CN)

( * ) Notice: Subject to any disclaimer, the term of this patent is extended or adjusted under 35 U.S.C. 154(b) by 0 days.

(21) Appl. No.: 19/026,332

(22) Filed: Jan. 16, 2025

(30) Foreign Application Priority Data

Nov. 17, 2023 (CN) .......................... 202311533698.9

(51) Int. Cl.
E21B 43/00 (2006.01)
G06T 17/20 (2006.01)
(52) U.S. Cl.
CPC .............. *E21B 43/00* (2013.01); *G06T 17/20* (2013.01); *E21B 2200/20* (2020.05); *E21B 2200/22* (2020.05)
(58) Field of Classification Search
CPC .. E21B 43/00; E21B 2200/20; E21B 2200/22; G06T 17/20
See application file for complete search history.

(56) References Cited

U.S. PATENT DOCUMENTS

2020/0160173 A1* 5/2020 Pandey ................. G06F 18/217
2023/0343029 A1* 10/2023 Wang .................... G06V 10/776

FOREIGN PATENT DOCUMENTS

CN 111415413 A 7/2020
CN 114943178 A 8/2022
(Continued)

OTHER PUBLICATIONS

Parra H, Salgado Gomes J, Shebl H. Integrated Workflow For Building 3d Digital Outcrop Models Using Unmanned Aerial Vehicles-Drones: Field Case Thamama Group, Wadih Rahbah, UAE. In Abu Dhabi International Petroleum Exhibition and Conference Nov. 13, 2017 (p. D041S109R004). Spe. (Year: 2017).*
(Continued)

*Primary Examiner* — Eunhee Kim
(74) *Attorney, Agent, or Firm* — Hawaii Patent Services; Nathaniel K. Fedde; Kenton N. Fedde

(57) ABSTRACT

Provided is a virtual drilling modeling method and system based on outcrop fine characterization. The method includes: selecting multiple typical sedimentary stratigraphic point positions respectively, and using an outcrop fine observation technology to characterize distribution characteristics of lithology, occurrence, thickness, and an extension range of each outcrop layer at the typical sedimentary stratigraphic point positions; establishing each vertical sequence stratigraphic histogram according to the distribution characteristics, the vertical sequence stratigraphic histogram being used to reflect vertical changes of actual stratigraphy; constructing a modeling data set according to each of the vertical sequence stratigraphic histograms and preset sample drilling core columns; and based on machine learning and interpolation operation methods, constructing a three-dimensional geological model according to the modeling data set. Through the high-precision outcrop characterization technology, the present disclosure can establish an
(Continued)

Select multiple typical sedimentary stratigraphic point positions respectively, and use an outcrop fine observation technology to characterize distribution characteristics of lithology, occurrence, thickness, and an extension range of each outcrop layer at the typical sedimentary stratigraphic point positions — 100

Establish each vertical sequence stratigraphic histogram according to the distribution characteristics — 200

Construct a modeling data set according to each of the vertical sequence stratigraphic histograms and preset sample drilling core columns — 300

Based on machine learning and interpolation operation methods, construct a three-dimensional geological model according to the modeling data set — 400 accurate three-dimensional geological model with lower cost and higher efficiency without actual drilling.

2 Claims, 1 Drawing Sheet

(56)                          References Cited

FOREIGN PATENT DOCUMENTS

KR            102549885  B1       7/2023
WO      WO-2019017962  A1  *    1/2019    ........... G01V 99/005

OTHER PUBLICATIONS

Jia R, Lv Y, Wang G, Carranza E, Chen Y, Wei C, Zhang Z. A stacking methodology of machine learning for 3D geological modeling with geological-geophysical datasets, Laochang Sn camp, Gejiu (China). Computers & Geosciences. Jun. 1, 2021;151: 104754. (Year: 2021).*
Bai S, Zhao J. Interpolation of geochemical data with aster images based on AlexNet convolution neural network. InIGARSS 2020-2020 IEEE International Geoscience and Remote Sensing Symposium Sep. 26, 2020 (pp. 244-247). IEEE. (Year: 2020).*
Li J, Liu P, Wang X, Cui H, Ma Y. 3D geological implicit modeling method of regular voxel splitting based on layered interpolation data. Scientific Reports. Aug. 16, 2022;12(1):13840. (Year: 2022).*
Melo A, Li Y. Geology differentiation by applying unsupervised machine learning to multiple independent geophysical inversions. Geophysical Journal International. Dec. 2021;227(3):2058-78. (Year: 2021).*

* cited by examiner

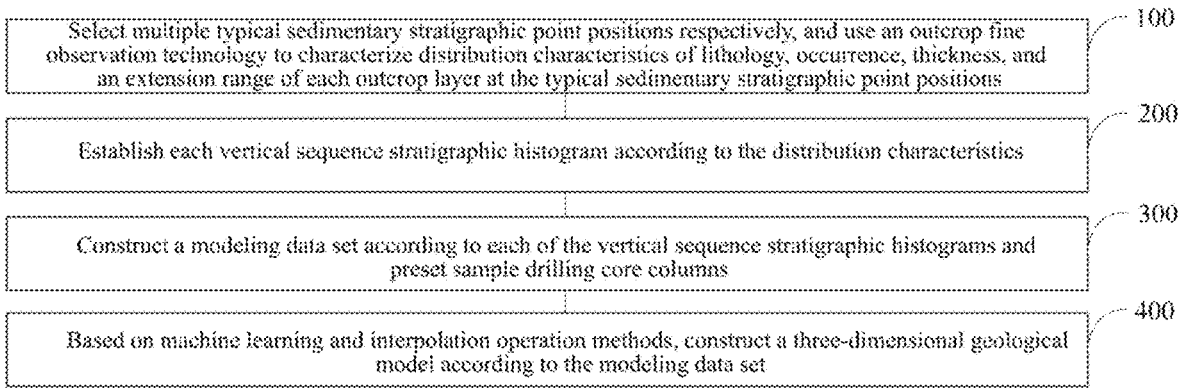

100

Select multiple typical sedimentary stratigraphic point positions respectively, and use an outcrop fine observation technology to characterize distribution characteristics of lithology, occurrence, thickness, and an extension range of each outcrop layer at the typical sedimentary stratigraphic point positions

200

Establish each vertical sequence stratigraphic histogram according to the distribution characteristics

300

Construct a modeling data set according to each of the vertical sequence stratigraphic histograms and preset sample drilling core columns

400

Based on machine learning and interpolation operation methods, construct a three-dimensional geological model according to the modeling data set

1

VIRTUAL DRILLING MODELING METHOD AND SYSTEM BASED ON OUTCROP FINE CHARACTERIZATION

CROSS-REFERENCE TO RELATED APPLICATION

This application claims priority of Chinese Patent Application No. 202311533698.9, filed on Nov. 17, 2023, the entire contents of which are incorporated herein by reference.

TECHNICAL FIELD

The present disclosure relates to the technical field of geological exploration, and in particular to a virtual drilling modeling method and system based on outcrop fine characterization.

BACKGROUND

In geological exploration and resource assessment, drilling data is an important means to obtain underground geological information. However, drilling operations are costly and time-consuming, limiting the number and density of drill holes. Existing geological modeling methods often rely on limited drilling data, resulting in insufficient model accuracy and reliability. Therefore, there is a need for a new cost-effective modeling method that can improve the accuracy of geological models.

SUMMARY

In order to overcome the deficiencies of the prior art, the object of the present disclosure is to provide a virtual drilling modeling method and system based on outcrop fine characterization. To achieve the above object, the present disclosure provides the following solutions:

A virtual drilling modeling method based on outcrop fine characterization, including:

selecting multiple typical sedimentary stratigraphic point positions respectively, and using an outcrop fine observation technology to characterize distribution characteristics of lithology, occurrence, thickness, and an extension range of each outcrop layer at the typical sedimentary stratigraphic point positions;

establishing each vertical sequence stratigraphic histogram according to the distribution characteristics, the vertical sequence stratigraphic histogram being used to reflect vertical changes of actual stratigraphy;

constructing a modeling data set according to each of the vertical sequence stratigraphic histograms and preset sample drilling core columns; and based on machine learning and interpolation operation methods, constructing a three-dimensional geological model according to the modeling data set.

Preferably, the method further includes:

correcting the three-dimensional geological model according to outcrop data obtained in real time to correct the three-dimensional geological model in real time.

Preferably, selecting multiple typical sedimentary stratigraphic point positions respectively, and using an outcrop fine observation technology to characterize distribution characteristics of lithology, occurrence, thickness, and an extension range of each outcrop layer at the typical sedimentary stratigraphic point positions includes:

deploying drones to take high-resolution photography of the typical sedimentary stratigraphic point positions, and using an oblique photography technology to capture images from different angles of the typical sedimentary stratigraphic point positions;

processing the images from the different angles to generate three-dimensional point cloud data;

analyzing the three-dimensional point cloud data, drawing outcrop stratigraphic profiles according to the distribution characteristics, and recording the sequence and characteristics of rock layers to obtain the distribution characteristics.

Preferably, processing the images from the different angles to generate three-dimensional point cloud data includes:

performing characteristic detection on the images from the different angles based on computer vision algorithms to obtain characteristic detection points;

performing characteristic matching on the characteristic detection points to obtain a three-dimensional structure; and performing three-dimensional reconstruction on the three-dimensional structure with preset camera parameters to obtain the three-dimensional point cloud data.

Preferably, based on machine learning and interpolation operation methods, constructing a three-dimensional geological model according to the modeling data set includes:

preprocessing modeling data to obtain preprocessed data;

performing characteristic selection on the preprocessed data to obtain modeling characteristics, the modeling characteristics including: lithology, mineral contents, density and magnetism;

inputting the modeling characteristics into a trained machine learning model to obtain geological attribute data;

performing interpolation on the geological attribute data to obtain an interpolation result;

performing meshing transformation according to the interpolation result to obtain a three-dimensional mesh; and smoothing and refining the three-dimensional mesh to obtain the three-dimensional geological model.

A virtual drilling modeling system based on outcrop fine characterization, including:

a characterization module, configured to select multiple typical sedimentary stratigraphic point positions respectively, and use an outcrop fine observation technology to characterize distribution characteristics of lithology, occurrence, thickness, and an extension range of each outcrop layer at the typical sedimentary stratigraphic point positions;

a histogram establishment module, configured to establish each vertical sequence stratigraphic histogram according to the distribution characteristics, the vertical sequence stratigraphic histogram being used to reflect vertical changes of actual stratigraphy;

a data set construction module, configured to construct a modeling data set according to each of the vertical sequence stratigraphic histograms and preset sample drilling core columns; and a model construction module, configured to, based on machine learning and interpolation operation methods, construct a three-dimensional geological model according to the modeling data set.

Preferably, the system further includes:

a correction module, configured to correct the three-dimensional geological model according to outcrop data obtained in real time to correct the three-dimensional geological model in real time.

Preferably, the characterization module includes:

a deployment unit, configured to deploy drones to take high-resolution photography of the typical sedimentary stratigraphic point positions, and use an oblique photography technology to capture images from different angles of the typical sedimentary stratigraphic point positions;

a point cloud processing unit, configured to process the images from the different angles to generate three-dimensional point cloud data; and an analysis unit, configured to analyze the three-dimensional point cloud data, draw outcrop stratigraphic profiles according to the distribution characteristics, and record the sequence and characteristics of rock layers to obtain the distribution characteristics.

Preferably, the point cloud processing unit includes:

a characteristic detection subunit, configured to perform characteristic detection on the images from the different angles based on computer vision algorithms to obtain characteristic detection points;

a characteristic matching subunit, configured to perform characteristic matching on the characteristic detection points to obtain a three-dimensional structure; and a reconstruction subunit, configured to perform three-dimensional reconstruction on the three-dimensional structure with preset camera parameters to obtain the three-dimensional point cloud data.

Preferably, the model construction module includes:

a modeling data preprocessing unit, configured to preprocess modeling data to obtain preprocessed data;

a characteristic selection unit, configured to perform characteristic selection on the preprocessed data to obtain modeling characteristics, the modeling characteristics including: lithology, mineral contents, density and magnetism;

a machine learning unit, configured to input the modeling characteristics into a trained machine learning model to obtain geological attribute data;

an interpolation unit, configured to perform interpolation on the geological attribute data to obtain an interpolation result;

a meshing unit, configured to performing meshing transformation according to the interpolation result to obtain a three-dimensional mesh; and a model establishment unit, configured to smooth and refine the three-dimensional mesh to obtain the three-dimensional geological model.

According to the specific embodiments provided by the present disclosure, the present disclosure discloses the following technical effects:

The present disclosure provides a virtual drilling modeling method and system based on outcrop fine characterization. The method includes: selecting multiple typical sedimentary stratigraphic point positions respectively, and using an outcrop fine observation technology to characterize distribution characteristics of lithology, occurrence, thickness, and an extension range of each outcrop layer at the typical sedimentary stratigraphic point positions; establishing each vertical sequence stratigraphic histogram according to the distribution characteristics, the vertical sequence stratigraphic histogram being used to reflect vertical changes of actual stratigraphy; constructing a modeling data set according to each of the vertical sequence stratigraphic histograms and preset sample drilling core columns;

and based on machine learning and interpolation operation methods, constructing a three-dimensional geological model according to the modeling data set. Through the high-precision outcrop characterization technology, the present disclosure can establish an accurate three-dimensional geological model with lower cost and higher efficiency without actual drilling.

BRIEF DESCRIPTION OF DRAWING

In order to more clearly illustrate the embodiments of the present disclosure or the technical solutions in the prior art, the accompanying drawings required to be used in the embodiments will be briefly introduced below. Obviously, the accompanying drawings in the following description are only for this purpose. For some embodiments of the present disclosure, those of ordinary skill in the art can also obtain other drawings based on these drawings without exerting any creative effort.

FIG. 1 is a method flow chart provided in an embodiment of the present disclosure.

DETAILED DESCRIPTION OF EMBODIMENTS

The technical solutions in the embodiments of the present disclosure will be clearly and completely described below in conjunction with the accompanying drawings in the embodiments of the present disclosure. Obviously, the described embodiments are only part of the embodiments of the present disclosure, rather than all embodiments. Based on the embodiments of the present disclosure, all other embodiments obtained by those of ordinary skill in the art without making creative efforts fall within the scope of protection of the present disclosure.

The object of the present disclosure is to provide a virtual drilling modeling method and system based on outcrop fine characterization. Through the high-precision outcrop characterization technology, the present disclosure can establish an accurate three-dimensional geological model with lower cost and higher efficiency without actual drilling.

In order to make the above-mentioned objects, characteristics and advantages of the present disclosure more obvious, and easy to understand, the present disclosure will be further described in detail below in conjunction with the accompanying drawings and implementations.

FIG. 1 is a method flow chart provided in an embodiment of the present disclosure. As shown in FIG. 1, the present disclosure provides a virtual drilling modeling method based on outcrop fine characterization, including:

Step 100: selecting multiple typical sedimentary stratigraphic point positions respectively, and using an outcrop fine observation technology to characterize distribution characteristics of lithology, occurrence, thickness, and an extension range of each outcrop layer at the typical sedimentary stratigraphic point positions;

Step 200: establishing each vertical sequence stratigraphic histogram according to the distribution characteristics, the vertical sequence stratigraphic histogram being used to reflect vertical changes of actual stratigraphy;

Step 300: constructing a modeling data set according to each of the vertical sequence stratigraphic histograms and preset sample drilling core columns; and Step 400: based on machine learning and interpolation operation methods, constructing a three-dimensional geological model according to the modeling data set.

Preferably, the method further includes:

correcting the three-dimensional geological model according to outcrop data obtained in real time to correct the three-dimensional geological model in real time.

Preferably, selecting multiple typical sedimentary stratigraphic point positions respectively, and using an outcrop fine observation technology to characterize distribution characteristics of lithology, occurrence, thickness, and an extension range of each outcrop layer at the typical sedimentary stratigraphic point positions includes:

deploying drones to take high-resolution photography of the typical sedimentary stratigraphic point positions, and using an oblique photography technology to capture images from different angles of the typical sedimentary stratigraphic point positions;

processing the images from the different angles to generate three-dimensional point cloud data; and analyzing the three-dimensional point cloud data, drawing outcrop stratigraphic profiles according to the distribution characteristics, and recording the sequence and characteristics of rock layers to obtain the distribution characteristics.

Specifically, this embodiment carries out high-resolution photography of a target area by deploying the drones; uses the oblique photography technology to capture the images from the different angles to obtain three-dimensional information; and processes the captured images to generate the high-precision three-dimensional point cloud data.

Further, this embodiment also applies RTK (real-time dynamic difference technology), and uses RTK GPS equipment to perform accurate positioning on the ground to assist in the accurate ground control point setting of drone images to ensure the spatial position accuracy of the three-dimensional model.

Preferably, processing the images from the different angles to generate three-dimensional point cloud data includes:

performing characteristic detection on the images from the different angles based on computer vision algorithms to obtain characteristic detection points;

performing characteristic matching on the characteristic detection points to obtain a three-dimensional structure; and performing three-dimensional reconstruction on the three-dimensional structure with preset camera parameters to obtain the three-dimensional point cloud data.

Further, this embodiment analyzes drone and RTK data to identify the lithology, occurrence, thickness and extension ranges of different layer positions. The detailed outcrop stratigraphic profiles are drawn, and the sequence and characteristics of the rock layers are recorded. Based on the observation data, the vertical sequence stratigraphic histogram for each outcrop is established to ensure that the histogram accurately reflects the vertical changes of the actual stratigraphy; and according to the geological background and research needs, multiple representative sedimentary stratigraphic point positions are selected. Detailed outcrop observations and data collection are conducted at these points to establish the multiple typical sequence stratigraphic histograms: processing the data at each selected point to establish the sequence stratigraphic histogram; and making sure that each histogram represents a typical stratigraphic sequence for the area in which it is located.

Further, this embodiment combines outcrop data and drilling core columns: combining outcrop sequence stratigraphic histograms with existing drilling core data. Through the above method, this embodiment can increase the number of data samples and improve the accuracy and reliability of the model.

Preferably, based on machine learning and interpolation operation methods, constructing a three-dimensional geological model according to the modeling data set includes:

preprocessing modeling data to obtain preprocessed data;

performing characteristic selection on the preprocessed data to obtain modeling characteristics, the modeling characteristics including: lithology, mineral contents, density and magnetism;

inputting the modeling characteristics into a trained machine learning model to obtain geological attribute data;

performing interpolation on the geological attribute data to obtain an interpolation result;

performing meshing transformation according to the interpolation result to obtain a three-dimensional mesh; and smoothing and refining the three-dimensional mesh to obtain the three-dimensional geological model.

Specifically, this embodiment selects a suitable machine learning model according to the modeling characteristics such as random forest, support vector machine, neural network. This embodiment further uses known geological data to train the model so as to predict the geological properties of unknown data points. Finally, cross-validation and other methods are used to evaluate the performance of the model.

Further, this embodiment selects an appropriate interpolation method, such as Kriging, radial basis function (RBF), multiple regression analysis, etc., to estimate the geological attributes of unsampled points. The interpolation method is also applied in three-dimensional space to generate continuous geological attribute distribution.

Corresponding to the above method, this embodiment further provides a virtual drilling modeling system based on outcrop fine characterization, including:

a characterization module, configured to select multiple typical sedimentary stratigraphic point positions respectively, and use an outcrop fine observation technology to characterize distribution characteristics of lithology, occurrence, thickness, and an extension range of each outcrop layer at the typical sedimentary stratigraphic point positions;

a histogram establishment module, configured to establish each vertical sequence stratigraphic histogram according to the distribution characteristics, the vertical sequence stratigraphic histogram being used to reflect vertical changes of actual stratigraphy;

a data set construction module, configured to construct a modeling data set according to each of the vertical sequence stratigraphic histograms and preset sample drilling core columns; and a model construction module, configured to, based on machine learning and interpolation operation methods, construct a three-dimensional geological model according to the modeling data set.

Preferably, the system further includes:

a correction module, configured to correct the three-dimensional geological model according to outcrop data obtained in real time to correct the three-dimensional geological model in real time.

Preferably, the characterization module includes:

a deployment unit, configured to deploy drones to take high-resolution photography of the typical sedimentary stratigraphic point positions, and use an oblique photography technology to capture images from different angles of the typical sedimentary stratigraphic point positions;

a point cloud processing unit, configured to process the images from the different angles to generate three-dimensional point cloud data; and an analysis unit, used to analyze the three-dimensional point cloud data, draw outcrop stratigraphic profiles according to the distribution characteristics, and record the sequence and characteristics of rock layers to obtain the distribution characteristics.

Preferably, the point cloud processing unit includes:

a characteristic detection subunit, configured to perform characteristic detection on the images from the different angles based on computer vision algorithms to obtain characteristic detection points;

a characteristic matching subunit, configured to perform characteristic matching on the characteristic detection points to obtain a three-dimensional structure; and a reconstruction subunit, configured to perform three-dimensional reconstruction on the three-dimensional structure with preset camera parameters to obtain the three-dimensional point cloud data.

Preferably, the model construction module includes:

a modeling data preprocessing unit, configured to preprocess modeling data to obtain preprocessed data;

a characteristic selection unit, configured to perform characteristic selection on the preprocessed data to obtain modeling characteristics, the modeling characteristics including: lithology, mineral contents, density and magnetism;

a machine learning unit, configured to input the modeling characteristics into a trained machine learning model to obtain geological attribute data;

an interpolation unit, used to perform interpolation on the geological attribute data to obtain an interpolation result;

a meshing unit, configured to performing meshing transformation according to the interpolation result to obtain a three-dimensional mesh; and a model establishment unit, configured to smooth and refine the three-dimensional mesh to obtain the three-dimensional geological model.

The beneficial effects of the present disclosure are as follows:

The present disclosure provides a novel virtual drilling modeling method. Through the high-precision outcrop characterization technology, the present disclosure can establish an accurate three-dimensional geological model with lower cost and higher efficiency without actual drilling.

Each embodiment in this specification is described in a progressive manner. Each embodiment focuses on the differences from other embodiments. The same and similar parts between the various embodiments can be referred to each other. As for the system disclosed in the embodiment, since it corresponds to the method disclosed in the embodiment, the description is relatively simple. For relevant details, please refer to the description in the method section.

Specific examples are used in this article to illustrate the principles and implementations of the present disclosure. The description of the above embodiments is only used to help understand the method of the present disclosure and its core idea; moreover, for those of ordinary skill in the art, there will be changes in the specific implementation and application scope based on the ideas of the present disclosure. In summary, the contents of this description should not be construed as limitations of the present disclosure.

The invention claimed is:

1. A virtual drilling modeling method based on outcrop fine characterization, comprising:

selecting multiple typical sedimentary stratigraphic point positions respectively, and using an outcrop fine observation technology to characterize distribution characteristics of lithology, occurrence, thickness, and an extension range of each outcrop layer at the typical sedimentary stratigraphic point positions;

establishing a vertical sequence stratigraphic histogram for each typical sedimentary stratigraphic point position according to the distribution characteristics, the vertical sequence stratigraphic histogram being used to reflect vertical changes of actual stratigraphy;

constructing a modeling data set according to each of the vertical sequence stratigraphic histograms and preset sample drilling core columns; and based on machine learning and interpolation operation methods, constructing a three-dimensional geological model according to the modeling data set;

selecting multiple typical sedimentary stratigraphic point positions respectively, and using an outcrop fine observation technology to characterize distribution characteristics of lithology, occurrence, thickness, and an extension range of each outcrop layer at the typical sedimentary stratigraphic point positions, comprising:

deploying drones to take photography of the typical sedimentary stratigraphic point positions, and using an oblique photography technology to capture images from different angles of the typical sedimentary stratigraphic point positions;

processing the images from the different angles to generate three-dimensional point cloud data;

analyzing the three-dimensional point cloud data, drawing outcrop stratigraphic profiles according to the distribution characteristics, and recording a sequence and characteristics of rock layers to obtain the distribution characteristics;

processing the images from the different angles to generate three-dimensional point cloud data, comprising:

performing characteristic detection on the images from the different angles based on computer vision algorithms to obtain characteristic detection points;

performing characteristic matching on the characteristic detection points to obtain a three-dimensional structure; and performing three-dimensional reconstruction on the three-dimensional structure with preset camera parameters to obtain the three-dimensional point cloud data;

wherein based on the machine learning and interpolation operation methods, constructing a three-dimensional geological model according to the modeling data set comprises:

preprocessing modeling data to obtain preprocessed data;

performing characteristic selection on the preprocessed data to obtain modeling characteristics, the modeling characteristics comprising: lithology, mineral contents, density, and magnetism;

inputting the modeling characteristics into a trained machine learning model to obtain geological attribute data;

performing interpolation on the geological attribute data to obtain an interpolation result;

performing meshing transformation according to the interpolation result to obtain a three-dimensional mesh; and

smoothing and refining the three-dimensional mesh to obtain the three-dimensional geological model.

2. The virtual drilling modeling method based on outcrop fine characterization according to claim 1, further comprising:

correcting the three-dimensional geological model according to the outcrop data obtained in real time to correct the three-dimensional geological model in real time.

\* \* \* \* \*

10